(12) United States Patent
Matsusaka

(10) Patent No.: US 9,483,351 B2
(45) Date of Patent: Nov. 1, 2016

(54) COMMUNICATION DEVICE AND COMMUNICATION METHOD

(71) Applicant: KYOCERA Document Solutions Inc., Osaka (JP)

(72) Inventor: Tetsuya Matsusaka, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 186 days.

(21) Appl. No.: 14/468,577

(22) Filed: Aug. 26, 2014

(65) Prior Publication Data

US 2015/0067396 A1    Mar. 5, 2015

(30) Foreign Application Priority Data

Aug. 28, 2013    (JP) ................. 2013-177196

(51) Int. Cl.
| | |
|---|---|
| G06F 11/00 | (2006.01) |
| G06F 11/14 | (2006.01) |
| H04L 1/00 | (2006.01) |
| H04L 1/18 | (2006.01) |

(52) U.S. Cl.
CPC ....... *G06F 11/1402* (2013.01); *G06F 11/1443* (2013.01); *H04L 1/0061* (2013.01); *H04L 1/188* (2013.01)

(58) Field of Classification Search
CPC .. H04L 1/0061; H04L 1/188; G06F 11/1402; G06F 11/1443
See application file for complete search history.

(56) References Cited

U.S. PATENT DOCUMENTS

| | | | |
|---|---|---|---|
| 2003/0217204 A1* | 11/2003 | Ono | G06F 3/0613 710/33 |
| 2012/0062929 A1* | 3/2012 | Ishii | G03G 21/1652 358/1.14 |
| 2014/0298118 A1* | 10/2014 | Miyamoto | G06F 11/0769 714/57 |

FOREIGN PATENT DOCUMENTS

| | | |
|---|---|---|
| JP | 2000-041057 A | 2/2000 |
| JP | 2008-123059 A | 5/2008 |
| JP | 5063085 B2 | 10/2012 |

* cited by examiner

*Primary Examiner* — Joshua P Lottich
(74) *Attorney, Agent, or Firm* — IP Business Solutions, LLC

(57) ABSTRACT

A communication device includes: a first communication section, a second communication section, a storage section, a determination section, and a control section. The first communication section communicates with a storage device based on predefined interface communication standards to perform data transfer. The second communication section communicates with an external device in a method other than the interface communication standards to perform data transmission. The storage section stores the selected error code that is previously defined to cause a bit error by noise. The determination section determines whether or not an error code indicated by the error information agrees with the selected error code. The control section, upon determination by the determination section that the error codes agrees with each other, gives the first communication section and the second communication section instructions for cancelling the data transfer and performing data re-transfer.

6 Claims, 5 Drawing Sheets

Fig.3

| BIT | DESCRIPTION | DESIGNATION |
|---|---|---|
| 21 | CRC ERROR | CRC ERROR OCCURRED AT LINK LAYER |
| 19 | 10b TO 8b DECODE ERROR | ERROR IN CONVERSION FROM TEN BITS TO EIGHT BITS |
| 16 | PHYRDY CHANGE | CHANGE IN STATE OF PHYRDY SIGNAL |

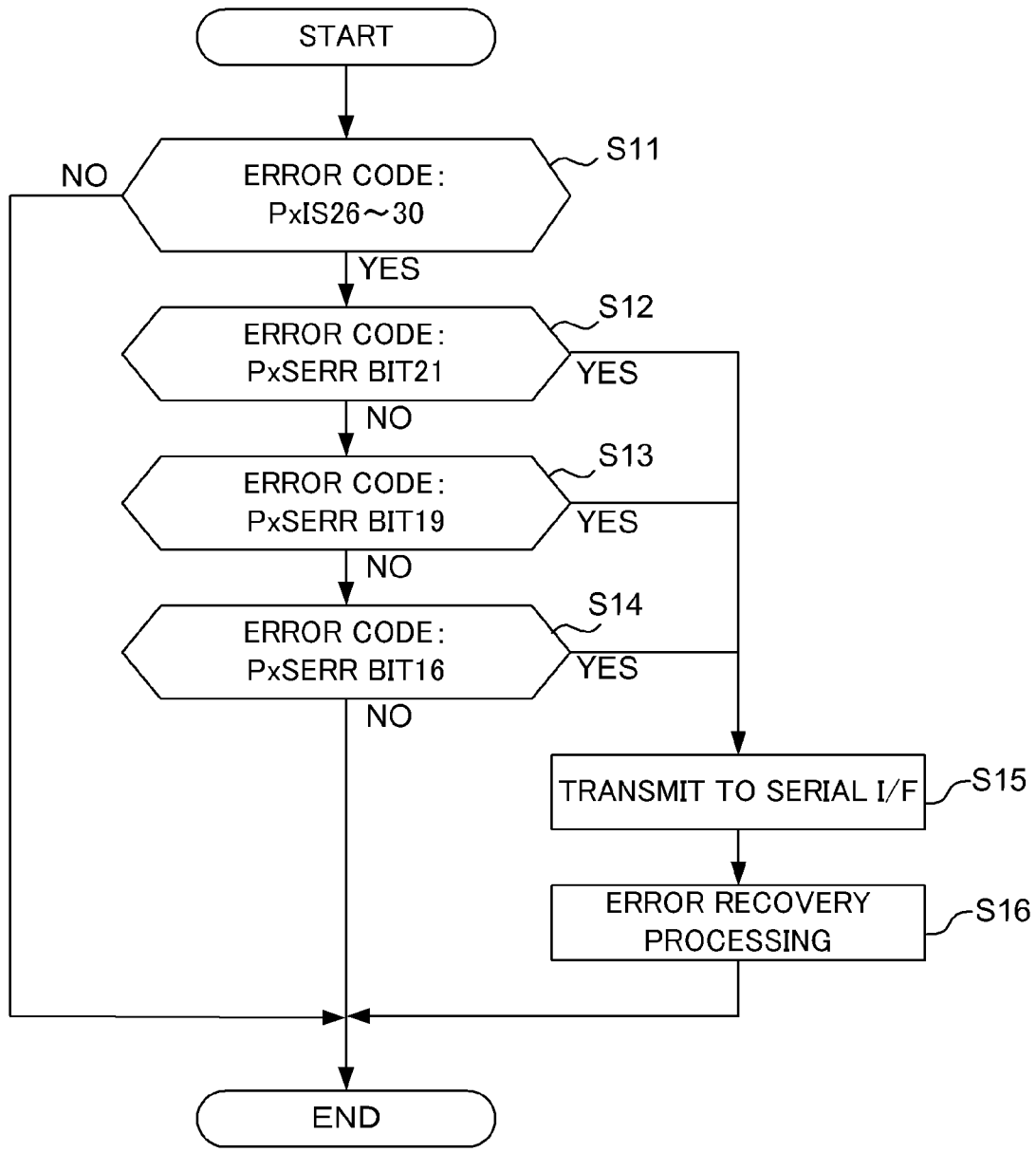

IN A CASE WHERE NO ERROR OCCURS

IN A CASE WHERE TIME OUT HAS OCCURRED

IN A CASE WHERE PRESENT INVENTION IS APPLIED

COMMUNICATION DEVICE AND COMMUNICATION METHOD

INCORPORATION BY REFERENCE

This application claims priority to Japanese Patent Application No. 2013-177196 filed on 28 Aug. 2013, the entire contents of which are incorporated by reference herein.

BACKGROUND

This disclosure relates to a communication device and a communication method communicating with a storage device to perform data transfer based on predefined interface communication standards.

The image forming apparatus such as a copier, a printer, or a facsimile compresses inputted image data and temporarily saves it in the storage device, extends the compressed data read from the storage device again, and then executes image formation processing based on this image data already subjected to the extension. Moreover, the image reading device such as a scanner loaded in the copier or the facsimile compresses read image data and then saves it in the storage device, and reads out the compressed data from the storage device when a read command has been inputted and extends it.

Moreover, used as the storage device is a hard disc storage device (hereinafter referred to as "HDD"). Data transfer to and from the HDD is performed based on interface (hereinafter referred to as "I/F") standards such as Serial Advanced Technology Attachment (SATA) standards. Typically, in the SATA standards, in a case where an error (abnormality) has occurred in the HDD or a connection port, or in a case where a transfer error has occurred, it is defined that an error code indicating contents and a state of the occurring error is notified and a plurality of error codes are prepared.

Even when no error occurs in the HDD, as a result of applying noise to an HDD-loaded device from outside, a bit error may occur in a reaction signal from the HDD and the error code indicating that a specific error is occurring may be notified. In particular, in the image processor such as the image forming apparatus handling a sheet material such as recording paper or a document in which static electricity easily cumulates or the image reading device, static electricity is easily generated, so that noise caused by the static electricity is likely to be applied to each device through a communication cable or a frame. This noise becomes a factor contributing to, for example, a transfer error.

Thus, known is a technology (technology A) with which the same data is transferred twice through one serial communication and the first and second data are compared with each other to make judgment on whether or not the data communication has been performed properly. Also known is a technology (technology B) with which upon noise detection by a noise detection circuit, the data communication is reset assuming that the SATA-I/F is facing communication abnormality.

SUMMARY

As one aspect of this disclosure, a technology obtained by further improving the aforementioned technologies is suggested.

A communication device according to one aspect of this disclosure includes: a first communication section, a second communication section, a storage device, a determination section, and a control section.

The first communication section communicates with a storage device based on predefined interface communication standards to perform data transfer.

The second communication section communicates with an external device in a method other than the interface communication standards to perform data transmission.

The storage section stores, of error codes defined in the interface communication standards, the selected error code that is previously defined to cause a bit error by noise The determination section, upon reception of error information from the storage device by the first communication device, determines whether or not an error code indicated by the error information agrees with the selected error code.

The control section, upon determination by the determination section that the error codes agrees with each other, gives the first communication section and the second communication section instructions for cancelling the data transfer and performing data re-transfer A communication method according to one aspect of this disclosure includes: a first communication step, a second communication step, a determination step, and a re-transfer step.

In the first communication step, communication with a storage device based on predefined interface communication standards is made to perform data transfer.

In the second communication step, communication with an external device in a method other than the interface communication standards is made to perform data transmission In the determination step, in a case where error information has been outputted from the storage device after the first communication step, it is determined whether or not an error code indicated by the error information agrees with a selected error code that is included in error codes defined by the interface communication standards and is previously defined to cause a bit error by noise.

In the re-transfer step, upon determination that the error codes agree with each other in the determination step, the communication based on the interface communication standards and data transfer in standards other than the interface communication standards are cancelled and then the data is re-transferred.

BRIEF DESCRIPTION OF THE DRAWINGS

FIG. 3 is a diagram partially showing data configuration of PxSERR registers;

FIG. 4 is a flowchart showing a flow of error processing;

DETAILED DESCRIPTION

Figure 1:
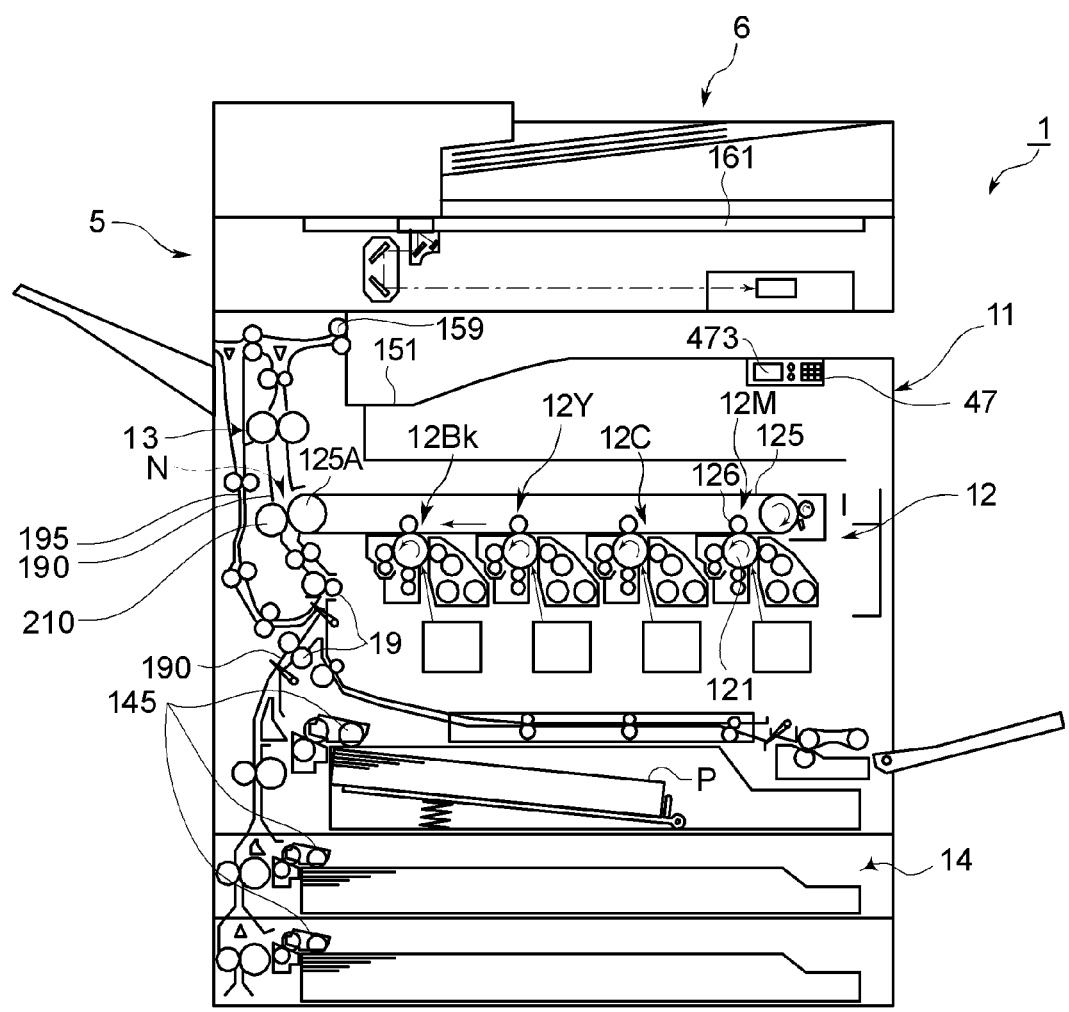
FIG. 1 is an elevation cross section showing a structure of an image forming apparatus.

Hereinafter, a communication device and a communication method according to one embodiment of this disclosure will be described with reference to the drawings. FIG. 1 is an elevation cross section showing a structure of an image forming apparatus 1 in this embodiment.

The image forming apparatus 1 as one example of the communication device may be any of, for example, a copier, a printer, a scanner, and a facsimile or a multifunction peripheral including these functions. The image forming apparatus 1 includes: in an apparatus body 11, an operation section 47, an image formation section 12, a fixing section 13, a paper feed section 14, a document feed section 6, an image reading section 5, etc.

The operation section 47 receives instructions, including an image formation operation execution instruction and a document reading operation execution instruction, from an operator for various operations and processing executable by the image forming apparatus 1. The operation section 47 includes a display section 473 displaying, for example, an operation guide for the operator.

To perform the document reading operation by the image forming apparatus 1, the image reading section 5 optically reads an image of a document fed by the document feed section 6 or a document loaded on document loading glass 161, and generate image data. The image data generated by the image reading section 5 is saved into an HDD or the like.

To perform the image formation operation by the image forming apparatus 1, based on, for example, the image data generated through the aforementioned document reading operation or the image data saved in the HDD, the image formation section 12 forms a toner image on recording paper P as a recording medium fed from the paper feed section 14. To perform color printing, a magenta image formation unit 12M, a cyan image formation unit 12C, an yellow image formation unit 12Y, and a black image formation unit 12Bk included in the image formation section 12, based on images formed of respective color components composing the aforementioned image data, respectively form toner images on photoconductive drums 121 through charging, exposure, and development processes, and these toner images are transferred onto an intermediate transfer belt 125 by a primary transfer roller 126.

The aforementioned toner images of the respective colors to be transferred onto the intermediate transfer belt 125 are superposed on one another on the intermediate transfer belt 125 through transfer timing adjustment, thereby forming a color toner image. A secondary transfer roller 210 transfers, at a nip part N where it sandwiches the intermediate transfer belt 125 with a driving roller 125A, the color toner image, which has been formed on a surface of the intermediate transfer belt 125, onto the recording paper P conveyed through a conveyance path 190 from the paper feed section 14. Then the fixing section 13 fixes the toner image on the recording paper P onto the recording paper P through thermal compression. The recording paper P on which the color image has already been formed and then subjected to the fixing processing is discharged to a discharge tray 151.

The paper feed section 14 includes a plurality of paper feed cassettes. A control unit to be described later drives, into rotation, a pick up roller 145 of the paper feed cassette storing recording paper of a size specified by instructions from the operator to thereby convey the recording paper P stored in each paper feed cassette towards the nip part N.

In the image forming apparatus 1, to perform two-sided printing, the recording paper P on one surface of which the image has been formed by the image formation section 12 is nipped by a discharge roller pair 159, and then the recording paper P is switched back by the discharge roller pair 159 and is conveyed to an inversion conveyance path 195, and is conveyed again by the conveyance roller pair 19 to an area upstream of the nip part N and the fixing section 13 in a direction in which the recording paper P is conveyed. As a result, the image is formed on the other surface of the recording paper by the image formation section 12.

Figure 2:
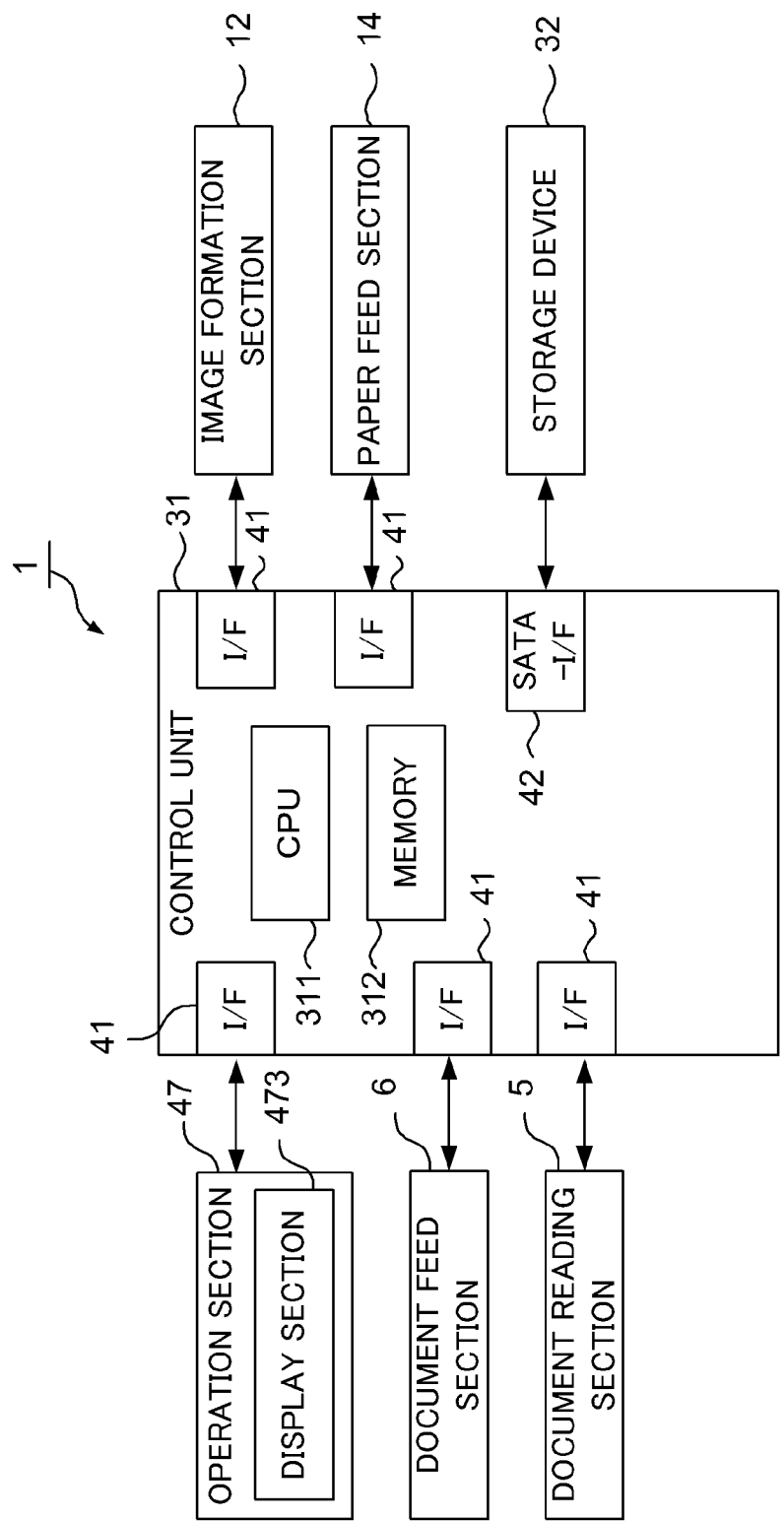
FIG. 2 is a functional block diagram showing main inner configuration of the image forming apparatus.

FIG. 2 is a functional block diagram showing main inner configuration of the image forming apparatus 1. The image forming apparatus 1 includes: a control unit 31 (communication device), the operation section 47, the document feed section 6, the image reading section 5, the image formation section 12, the paper feed section 14, a storage device 32, etc. Hereinafter, components described in FIG. 1 will be marked with the same numerals and omitted from the description.

The storage device 32 is a high-capacity storage device that stores, for example, a document image read by the image reading section 5, a non-volatile storage device complying with SATA standards, and a magnetic disc device or an optical disc device. It is needless to say that it may be a device including a recording medium adopting a different method. Illustrated as a storage device in this embodiment is the storage device 32, but instead of the storage device 32, a storage device such as a memory card, a compact disc (CD) drive, or a digital video disc (DVD) drive may be applied, as long as it permits reading and writing of, for example, image data through communication based on the SATA standards.

The control unit 31 is composed of for example, a central processing unit (CPU) 311 (determination section, control section), a memory 312 (storage section), an interface circuit (hereinafter referred to as "I/F") 41 (second communication section), and a SATA-I/F 42 (first communication section). The CPU 311 executes reads out various programs stored in the memory 312 and performs processing, and performs, for example, outputting of an instruction signal to the various functional sections and data transfer and then performs overall control of the image forming apparatus 1.

The I/F 41 is an interface circuit for performing communication based on standards other than the SATA standards. The communication based on the standards other than the SATA standards is serial communication or parallel communication, and is based on standards with which noise occurrence cannot be detected from error information transmitted during data transfer. For example, for data communication between the control unit 31 and the operation section 47, the document feed section 6, the image reading section 5, the image formation section 12 and the paper feed section 14, the serial communication is adopted, and the I/F 41 is a serial I/F in this embodiment.

The SATA-I/F 42 is an interface circuit based on the SATA standards, and the control unit 31 and the storage device 32 perform communication based on the SATA standards. Moreover, the communication based on the SATA standards are based on standards with which noise occurrence can be detected from the error information transmitted during the data transfer.

Stored in the memory 312 are, in addition to the various programs, Port x Serial ATA Error (PxSERR) registers showing detailed states of errors related to the SATA communication at a port of connection with the storage device 32. FIG. 3 is a diagram partially showing data configuration of the PxSERR registers.

Error codes shown in FIG. 3 combine error contents and bit numbers, and are expressed as, for example, PxSERR#21. Moreover, error information showing error states of the error codes combines error contents, bit numbers, and one-bit information showing states of the error contents. That is, the error information is obtained by adding the one-bit information to the error codes.

For example, if information of a one-bit information portion is "0", this indicates not an error state but normality, and if the information is "1", this denotes an error state. In this embodiment, the PxSERR#21, PxSERR#19, and PxSERR#16 are set as selected error codes and stored in the memory 312. It has been found that when static electricity is transmitted to the storage device 32 as a result of repeatedly performing a noise experiment with the static electricity on the image forming apparatus 1 by the inventor, a bit error occurs and the one-bit information showing the error states are rewritten, and the aforementioned error codes (PxSERR#21, PxSERR#19, and PxSERR#16) arise.

Here, the CRC Error of PxSERR#21 is an error in cyclic redundancy check (CRC) as a method of detecting an error in a frame (called a packet) as one unit in which image data is transferred. The storage device 32 that has received this error-accompanied frame abandons this frame. Moreover, 10b-to-8b Decode Error of PxSERR#19 is an error in encoding from ten bits to eight bits. Moreover, PHYRDY Change of PxSERR#16 is an error in a change made in a physical layer ready state (PHYRDY state) indicating that the storage device 32 is in a preparation state in which reading and writing can be performed.

Next, one example of the error processing executed by the CPU 311 will be described. FIG. 4 is a flowchart showing a flow of the error processing in this embodiment.

First, to perform data transfer based on the SATA standards to the storage device 32, the CPU 311 performs initial processing of establishing communication with the storage device 32 before the data transfer. Then after the communication establishment, the data transfer processing is performed.

During this data transfer, upon detection by the CPU 311 that the SATA-I/F 42 has received the error information, the CPU 311 determines to which of the PxIS #26 to #29 the error code corresponds (Step S11). The PxIS denotes Port x Interrupt status in the port of connection between the storage device 32 and the SATA-I/F 42. Here, if the error code does not correspond to any of the PxIS #26 to #30 (No in step S11), the CPU 311 ends this error processing.

If the error code corresponds to any of the PxIS #26 to #29 (Yes in step S11), the CPU 311 determines whether or not the error code corresponds to the PxSERR #21 (Step S12). If the error code does not correspond to PxSERR #21 (No in step S12), the CPU 311 determines whether or not the error code corresponds to the PxSERR #19 (Step S13). If the error code does not correspond to the PxSERR #19 (No in step S13), the CPU 311 determines whether or not the error code corresponds to the PxSERR #16 (Step S14). That is, the CPU 311 determines whether or not the error code corresponds to any of the PxSERR #21, PxSERR #19, and PxSERR #16 as selected error codes that are previously defined to cause a bit error by noise.

If the received error code does not correspond to any of the three described above (No in all of steps S12 to S14), that is, if the error code transmitted from the storage device 32 does not agree with the three selected error codes, noise is not a cause of the error and thus a different action is taken.

If any of the error codes corresponds to any of the three selected error codes (Yes in any of steps S12 to S14), the CPU 311 gives the serial I/F 41 instructions for cancelling the data transfer and performing re-transfer (step S15). Then error recovery processing is executed (step S16).

The error recovery processing will be described. The CPU 311 performs the error recovery processing of temporarily disconnecting communication between the SATA-I/F 42 and the storage device 32 and then performing the initial processing again to establish communication with the storage device 32. Note that, however, the error recovery processing is not limited to this. The error recovery processing may be processing for restoring a state in which data transfer between the SATA-I/F 42 and the storage device 32 can be performed. For example, in a case where permit for access to the storage device 32 has been lost or this access has been limited as a result of notifying the error code from the storage device 32, processing of recovering the right of this access is also the error recovery processing.

Figure 5A:
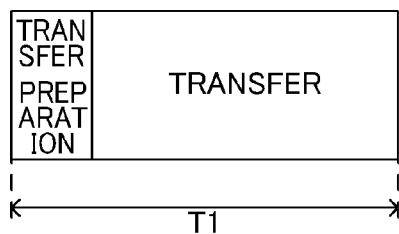
FIG. 5A is a diagram illustrating data transfer in a case where no error occurs.
Figure 5B:
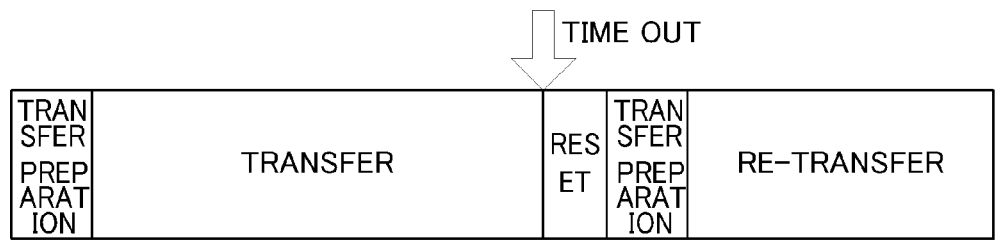
FIG. 5B is a diagram illustrating data transfer in a case where time out is awaited after an error and then data re-transfer is performed.
Figure 5C:
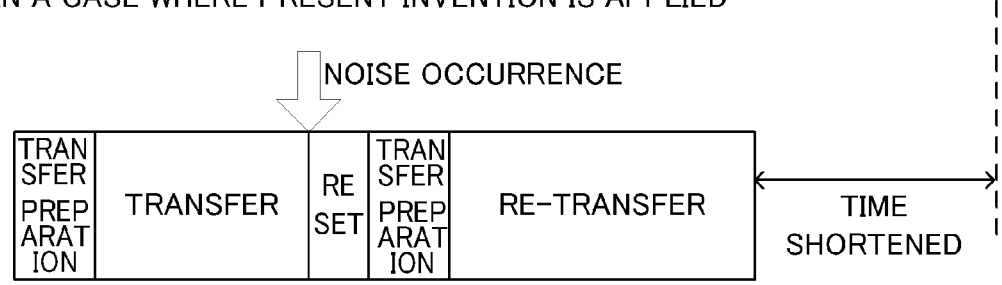
FIG. 5C is a diagram illustrating data transfer in a case where data transfer is performed by using the error processing according to one embodiment of this disclosure.

FIGS. 5A to 5C are diagrams illustrating the data transfer. FIG. 5A is a diagram showing a case where no error occurs, FIG. 5B is a diagrams showing a case where time out is awaited after an error and then data re-transfer is performed, and FIG. 5C is a diagram showing a case where data transfer is performed by using error processing according to one embodiment of this disclosure.

First, transfer of a predefined volume of data is performed, and if no error occurs during the transfer (FIG. 5A), it is assumed that it takes time T1 from transfer preparation to end of transfer. Then FIG. 5B shows a case where some communication trouble has occurred during the same data transfer. It normally takes only the time T1 described above from the transfer preparation to the end of transfer, but in a case where the data transfer does not end even after passage of predefined time from the time T1 as a result of occurrence of some trouble, the CPU 311 detects time out and then causes the serial I/F 41 to perform reset processing of temporarily cancelling the transfer. Then it causes the transfer preparation and the data transfer to be performed.

FIG. 5C shows a case where this disclosure is applied. During the data transfer, in a case where the SATA-I/F 42 has received the error information and the error code indicated by this information corresponds to any of PxIS #16, #19, or #21, the CPU 311 judges that noise has occurred, and causes the serial I/F 41 to perform the reset processing of temporarily cancelling the transfer. Then it causes the transfer preparation and the data re-transfer to be performed. That is, if the CPU 311 has judged from the error information from the SATA-I/F 42 that noise has occurred, the CPU 311 temporarily cancels the processing during the transfer and then causes the serial I/F 41 to perform data re-transfer regardless of whether or not noise has actually occurred.

From the error information of the SATA-I/F 42, it is unknown whether or not noise has occurred in the serial I/F 41. However, it is highly possible that noise has also occurred in the serial I/F 41, and leaving it results in failure to detect a transfer error by time out as shown in FIG. 5B, so that it takes time until end of the data transfer. Thus, in this embodiment, the error information received by the SATA-I/F 42 is used for noise detection of all the I/Fs included in the control unit 31. This permits start of data re-transfer without waiting for time out of the data transfer, which therefore makes it possible to shorten the time taken until the end of data transfer.

Moreover, for example, in the technology A described above, timing at which it is judged whether or not data communication is properly performed is only after the first and second data transfer, and it can be judged only after completion of the data transfer whether or not communication has been properly performed. That is, it takes time until detection of abnormality occurrence. Moreover, in the technology B described above, a noise detection circuit is required, resulting in a cost increase. Further, the detection circuit needs to be set at a position where noise on the SATA-I/F can be detected, limiting configuration of a substrate.

On the contrary, with the image forming apparatus 1 (communication device) and a communication method according to one embodiment of this disclosure, if the error code transmitted from the storage device 32 is the error code (for example, PxSERR #16, #19, or #21) that is previously defined to cause a bit error by noise, the CPU 311 gives the serial I/F 41 instructions for temporarily cancelling data transfer and performing re-transfer, thereby permitting it to perform the data re-transfer without waiting for time out. That is, the time taken until the end of data transfer can be shortened.

Further, by using the error information of the SATA-I/F 42, noise detection in the serial I/F 41 can be performed even without providing, for example, a noise detection circuit, which can therefore reduce the cost accordingly.

Moreover, illustrated in the embodiment described above is an example in which the error codes causing a bit error by noise such as static electricity are specified as PxSERR #21, PxSERR #19, and PxSERR #16. However, this example refers to a case where a noise experiment by static electricity is performed on the image forming apparatus 1, and is not limited to the aforementioned three error codes. For example, the CPU 311, by using any one of the aforementioned three error codes, may determine whether or not instructions for cancelling the data transfer and performing re-transfer are to be given to the serial I/F 41.

Moreover, the embodiment described above has been described, referring to an example in which this disclosure is applied to the image forming apparatus 1, but this disclosure can also be applied to an image processor represented by an image reading device, such as a scanner, that processes image data or an image forming apparatus such as a printer, or a communication device or an information processor, such as a computer, that processes various pieces of data.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A communication device comprising:
   a first communication section communicating with a storage device based on predefined interface communication standards to perform data transfer;
   a second communication section communicating with an external device in a method other than the interface communication standards to perform data transmission;
   a storage section storing, of error codes defined in the interface communication standards, a selected error code that is previously defined to cause a bit error by noise;
   a determination section, upon reception of error information from the storage device by the first communication section, determining whether or not an error code indicated by the error information agrees with the selected error code; and
   a control section, upon determination by the determination section that the error code indicated by the error information agrees with the selected error code, giving the first communication section and the second communication section instructions for cancelling the data transfer and performing data re-transfer.

2. The communication device according to claim 1, wherein the interface communication standards are communication standards permitting judgment, based on the error code indicated by the error information, that noise has occurred in a data transfer source and a data transfer destination during the data transfer.

3. The communication device according to claim 1, wherein the interface communication standards are Serial-ATA standards.

4. The communication device according to claim 1, wherein the control section, after giving the instructions for cancelling the data transfer and performing the data re-transfer, executes error recovery processing for restoring a state in which data transfer between the first communication section and the storage device can be performed.

5. The communication device according to claim 1, wherein the selected error code includes at least one of an error code indicating an error in a cyclical redundancy check, an error code indicating an error in processing of encoding from ten bits to eight bits, and an error code indicating an error with a change in a PHYRDY state.

6. A communication method comprising:
   a first communication step of communicating with a storage device based on predefined interface communication standards to perform data transfer;
   a second communication step of communicating with an external device in a method other than the interface communication standards to perform data transmission;
   a determination step of, in a case where error information has been outputted from the storage device after the first communication step, determining whether or not an error code indicated by the error information agrees with a selected error code that is included in error codes defined by the interface communication standards and is previously defined to cause a bit error by noise; and
   a re-transfer step of, upon determination that the error code indicated by the error information agrees with the selected error code in the determination step, cancelling the data transfer based on the interface communication standards and the data transfer in standards other than the interface communication standards and then performing data re-transferring.

* * * * *